Patented Feb. 16, 1937

2,071,251

UNITED STATES PATENT OFFICE 2,071,251

FIBER AND METHOD OF PRODUCING IT

Wallace H. Carothers, Wilmington, Del., assignor, by mesne assignments, to E. I. du Pont de Nemours and Company, Wilmington, Del., a corporation of Delaware No Drawing. Original application July 3, 1931, Serial No. 548,701. Divided and this application March 14, 1933, Serial No. 660,778, renewed September 10, 1936

35 Claims. (Cl. 18—54)

This application is a division of my copending case Serial No. 548,701, filed July 3, 1931.

This invention relates to the preparation of high molecular weight linear superpolymers having unusual and valuable properties, and more particularly it relates to the production of fibers from synthetic materials, and to a new method of propagating chemical reactions.

Linear condensation polymers of various types, particularly linear polyesters, have been described in the scientific and patent literature (Carothers and Arvin, J. Am. Chem. Soc. 51, 2560 (1929); Lycan and Adams, ibid., 51, 3450 (1929), and in the applications of Wallace H. Carothers, Serial Numbers 382,843 and 406,721 filed August 1, 1929 and November 12, 1929, respectively). Through the application of the principles set forth in these citations, linear polyesters of moderately high molecular weight have been obtained. Thus, if ethylene glycol and succinic acid in equivalent amounts are heated together in a closed container one obtains a mixture in the form of a liquid or pasty mass which is partly composed of polymeric ethylene succinate of low molecular weight together with water, unchanged succinic acid, and unchanged glycol. If the same reactants are heated in a distilling flask arranged so that the water can distil out of the reaction mixture as fast as it is formed, practically all the succinic acid and glycol are finally used up and the product consists of polymeric ethylene succinate having a molecular weight of about 1500. If the heating of this product is continued in the distilling flask under vacuum its molecular weight finally rises to about 3000. At this stage an apparent limit has been reached, and so far as I am aware no linear condensation polymers having the same unique properties and having an average molecular weight as high as my new compounds have ever been prepared hitherto.

The synthetic linear condensation superpolymers produced in accordance with the present invention are suitable for the production of artificial fibers which are pliable, strong, and elastic and which show a high degree of orientation along the fiber axis. In this respect they resemble cellulose and silk which, as recent researches have proved, are also linear superpolymers. (Meyer, Biochemische Zeitschrift, 214, 253–281 (1929)). So far as I am aware, no synthetic material has hitherto been prepared which is capable of being formed into fibers showing appreciable strength and pliability, definite orientation along the fiber axis, and high elastic recovery in the manner characteristic of the present invention. It is true that Staudinger has frequently emphasized the probable structural analogy between polyoxymethylene and cellulose, and he has shown (Z. Krist. 70, 139 (1929)) that it is possible to obtain polyoxymethylene in the form of oriented fibers, but these fibers are only a few millimeters in length and they are very fragile. It is true also that threads or filaments can be drawn from any tough thermoplastic resin, and British Patent 303,867 (French equivalent 667,077) discloses a process for making artificial silk in which a condensation product of a polyhydric alcohol and a polybasic acid or its anhydride is employed as a raw material. British Patent 305,468 discloses a process for making synthetic fibers from a urea-formaldehyde resin. But there is nothing in the disclosures of these references to indicate that the filaments or fibers are sufficiently strong or pliable to have any utility, and insofar as I am able to ascertain, filaments or fibers produced in accordance with the disclosures of these patents do not have any useful degree of pliability, strength, or elasticity.

Before considering in detail the objects of the invention and the methods for their attainment, it will be advantageous, for a better understanding of the present invention involving the production of linear condensation superpolymers, to refer to certain definitions and considerations involved in the production of the known linear condensation polymers.

I use the term condensation to name any reaction that occurs with the formation of new bonds between atoms not already joined and proceeds with the elimination of elements ($H_2$, $N_2$, etc.) or of simple molecules ($H_2O$, $C_2H_5OH$, $HCl$, etc.) Examples are: esterification, $R-COOH + HO-R' \rightarrow R-CO-O-R' + H_2O$;

amide formation, $R-CO-OC_2H_5 + NH_2-R' \rightarrow$
$R-CO-NH-R' + C_2H_5OH$;

ether formation, $R-OH + HO-R' \rightarrow R-O-R' + H_2O$;

anhydride formation, $2R-COOH \rightarrow (R-CO)_2O + H_2O$.

Condensation polymers are compounds formed by the mutual condensation of a number of (functionally) similar molecules to form a single molecule.

Linear polymers are compounds whose molecules are long chains built up from repeating units. This type of structure may be symbolized by the general formula

. . . —A—A—A—A—A—A—A—A . . .

The unit or radical A, I call the structural unit of the polymer. Depending upon the nature of the starting materials the units of a given chain may be alike or different.

Linear condensation polymers are linear polymers formed by reactions of condensation as defined above. Examples are:

(a) Polyesters formed by the intermolecular self-esterification of hydroxy acids, HO—R—COOH+HO—R—COOH→
    HO—R—CO—O—R—COOH+H$_2$O
2HO—R—CO—O—R—COOH→
    HO—R—CO—O—R—CO—O—
        R—CO—O—R—COOH+H$_2$O, etc.;

(b) Polyesters formed by the action of dibasic acids on dihydric alcohols, n HOOC—RCOOH+(n+1) HO—R'—OH→
    HO—R'—O—(CO—R—CO—O
        R'—O)$_n$H+H$_2$O, etc.;

(c) Polyamides derived from esters of amino acids.

H$_2$N—R—COOR'+H$_2$N—R—COOR'+H$_2$N—R—
  COOR'→H$_2$N—R—CO—NH—R—CO—
    NH—R—CO—OR'+2R'OH, etc.;

(d) Polyethers formed by the intermolecular self-esterification of glycols,

HO—R—OH+HO—R—OH+HO—R—
  OH+ etc.→HO—R—O—R—O—R—O—R—
      O—R—O etc.,+H$_2$O (e) Polyanhydrides derived from dibasic acids, HOOC—R—COOH+HOOC—R—COOH+ etc.→
  HOOC—R—CO—O—OC—R—
    CO—O—OC—R—CO—etc.,+H$_2$O It may be observed that each of these starting compounds contains two (and only two) functional groups capable of participating in the condensation. I call such compounds bifunctional compounds, and their reactions bifunctional reactions. My invention is concerned not with polyfunctional condensations generally, but only with bifunctional condensations. This restriction is necessary since the presence of more than two functional groups in any of the reacting compounds introduces the possibility of developing a three-dimensional polymeric structure; and this involves a complication with which my invention is not concerned.

It is a characteristic feature of bifunctional condensations, such as those exemplified in the general Equations (a), (b), (c), (d), and (e), that they present the formal possibility of producing molecules of infinite length. Thus the self-esterification of ten molecules of hydroxy acid, HO—R—CO—OH, would lead to the formation of the polyester, HO—R—CO—(O—R—CO—)$_8$—O—R—CO—OH, and this, since its molecule still bears the terminal groups which were responsible for the initial reaction, is (formally) capable of reacting with itself to produce a new molecule twice as long. A continuation of this progressive coupling would finally yield a molecule of infinite length.

In practice there are several factors that may be expected to interrupt this progressive coupling before the molecules have grown to any very great length. The following may be mentioned:

(1) Reaction may be intramolecular at some stage (i. e., it may lead to the formation of a ring).

(2) The terminal functional groups responsible for the progressive coupling may be lost or mutilated through side reactions.

(3) Mechanical factors such as solubility and kinetic effects may come into play.

I have devoted considerable study to reactions of the type defined above as bifunctional condensations and have discovered the following facts: Such reactions are usually exclusively intermolecular at every stage, and the terminal groups responsible for the initial reaction are still present at the ends of the product molecule. Interruption of the progressive coupling through intramolecular reaction (ring formation) occurs generally only through the formation of 5-atom rings, less frequently through the formation of rings of 6 atoms, and rarely through the formation of rings of 7 or 3 atoms. The loss or mutilation of terminal groups through side reaction occurs only when patently inappropriate experimental conditions are adopted. Thus in most cases there is nothing theoretically to preclude the possibility of producing exceedingly long molecules in bifunctional condensations.

It is well known that reactions such as esterification, ester interchange, amide formation, etherification, anhydride formation or acetal formation are reversible reactions, and that such reactions can be forced to completion by the separation of the reaction products as they are formed. But from the facts outlined above it follows that if the reversible reaction is a bifunctional condensation, the degree of completeness of the reaction will regulate the size of the molecule in the polymeric product; the more nearly complete the reaction, the longer the molecule; and the reaction can be absolutely complete only when the product molecule is infinitely long. According to the present invention reactions of this type are brought to a degree of completeness heretofore unknown.

This invention has as an object the preparation of new and useful filaments and fibers. A further object is the manufacture from wholly synthetic materials of strong, pliable fibers useful in the textile and other arts. A further object resides in processes for making my new fibers. Other objects will appear hereinafter.

These objects are accomplished by spinning or drawing filaments and fibers from a synthetic linear condensation superpolymer in accordance with the procedure described in detail in the following specification.

It may be observed that the results described herein furnish a very satisfactory verification of the theory referred to herein. It is to be understood, however, that I do not desire the claims to be limited thereby inasmuch as the theory has been presented in detail merely to make clear the nature of the invention and especially to explain the terminology used in describing it.

For a more complete understanding of the nature of the invention and the method of carrying it out reference may be had to the following comparison of the properties and methods of production of a known linear condensation polymer with my new linear condensation superpolymer made from the same materials.

It has already been mentioned that the polyester, ethylene succinate, can be obtained by heating together succinic acid and ethylene glycol, and if the heating is finally carried out in a good vacuum the polyester finally obtained has a molecular weight of about 3000. This material is a brittle, opaque solid which melts at about 100° C. to a very viscous liquid; it dissolves readily in certain solvents (e. g. chloroform) and can be precipitated or crystallized in the form of a dusty, white powder (microcrystalline). This material has very little utility as such. In the massive form it is rather fragile, weak, and brittle.

But now according to the present invention I submit this polyester to conditions which favor further reaction (esterification or ester interchange) and at the same time cause a very complete and effective removal of any possible volatile products. For example, I heat this polyester at 200° C. in a molecular still, more specifically referred to hereinafter, for several days. A small amount of volatile material is removed, and the polyester which remains as a residue is found to have a much higher molecular weight (considerably higher than 10,000). It is my theory that this effect is due to a continuation of the initial bifunctional coupling, i. e., the terminal groups of the initial polyester molecules react with each other to produce still longer molecules. In any event it is a fact that the new product although it closely resembles the initial polyester in its analytical composition and chemical behavior, nevertheless differs profoundly from the initial polyester in its physical properties.

The new superpolyester is an exceedingly strong, tough, and flexible mass. It is opaque and on being heated to about 100° C. it melts, i. e., it becomes transparent, but the molten mass at this temperature is so viscous that it shows no tendency to flow. When brought into contact with solvents this material imbibes solvent and swells before dissolving, and finally yields highly viscous solutions. But the most remarkable property of the new superpolymer is its capacity to be drawn out into fibers or threads which are pliable and strong and which have a high elastic recovery and which show evidence of a high degree of orientation along the fiber axis.

The molecular still which is referred to above, and is more fully described below, consists essentially in a highly evacuated vessel provided with a condenser placed at a distance from the evaporating surface less than the mean free path of the evaporating molecules. It is to be observed that in molecular distillation, where arrangements are made for the capture of most of the escaping molecules in their first free paths, which in the specific instance above has been carried out by means of a molecular still for the production of the ethylene succinate superpolymer, the situation is radically different from ordinary distillation where the removal of the escaping molecules depends upon an appreciable vapor pressure, (as in the preparation of the known polyester ethylene succinate referred to above), of the compound distilling and a consequent stream of vapor from the distilling surface sufficient to prevent return. Ordinary distillation thus fails as a means of displacing equilibria when the vapor pressure of the distilling substance falls to a value below that necessary to maintain a continuous stream of vapor. When this condition obtains the situation is that of a dynamic equilibrium where as many molecules are reflected back by collision and reenter the evaporating surface as escape from it. Under these conditions equilibrium will be displaced only by the relatively slow process of diffusion of the volatile product or products to a part of the apparatus from which return is impossible. When molecular distillation is carried out with a molecular still, the distillation is conducted under very low pressure with a condenser so arranged that the distance from the distilling surface to the condenser is less than the mean free path of the distilling molecules at the pressure and temperature used. Under these conditions any molecule escaping from the distilling surface enjoys a very high probability of reaching the condenser without collision with another molecule. The condenser is maintained at such a temperature that the escaping tendency of the molecules of the distillate is negligible. A convenient form of molecular still consists of a tube or vessel in the bottom of which the distilling substance is heated, and a second tube fitting tightly into the neck of the first tube and extending therein so that the bottom of the second tube which forms the condensing surface is within the required distance from the distilling surface, provision being had for the presence of a cooling medium in the second tube and for the application of vacuum to the chamber formed by the internal walls of the first tube and the external walls of the second tube.

For the successful operation of molecular distillation the following conditions must be fulfilled:

(1) The reaction mixture must be maintained at a temperature at which the rate of reaction is appreciable and the volatile product to be removed has a significant vapor pressure ($10^{-5}$ mm. or above).

(2) The condenser must be maintained at a temperature at which the volatile product will have a negligible vapor pressure.

(3) The pressure must be sufficiently low to render the mean free path of the distilling molecules equal to or greater than the distance from the evaporating surface to the condenser.

The method is of course very flexible. The temperature of both the reacting mixture and the condenser may be varied over a very wide range. The expression "mean free path" used herein is employed in the usual sense and may be defined as the mean distance traveled by a molecule between successive collisions with other molecules. The value of the mean free path (L) in centimeters is given by the following formula:

$$L = 12.86 \cdot \frac{n}{p} \sqrt{\frac{T}{M}}$$

where $n$ is the viscosity in c. g. s. units, $p$ the pressure in mm., T the absolute temperature, and M the molecular weight. The following table gives values of the mean free path of mercury at various pressures at 0° C.

| Pressure | M. F. P. |
|---|---|
| 0.75 x $10^{-3}$ mm. of Hg | 3.24 cm. |
| 0.75 x $10^{-4}$ | 32.4 cm. |
| 0.75 x $10^{-5}$ | 324 cm. |

The values for other substances will, in general, be different but of the same order of magnitude. It is advantageous to arrange the condenser at a shorter distance from the evaporating surface than the higher values of the mean free path of mercury given above, ordinarily less than 10 centimeters. The maximum distance that the condensing surface may be placed from the distilling substance depends upon the pressure used. The permissible distance is greater at very low pressures and in some instances may be as high as 20 centimeters.

While molecular distillation is not new per se as disclosed by the following references: Washburn, Bureau of Standards Journal of Research 2, 476, (1929); Burch, Proc. Roy. Soc. (London) 123, 271, (1929); Bronsted and Hevesy, Phil. Mag. 43, 31 (1922); and Synthetic Organic Chemicals, Eastman Kodak Co., Bulletin, Vol. II, No. 3, February 1929, molecular distillation has heretofore been applied to processes involving nothing more than the separation of substances by distillation, as the separation of the isotopes of mercury, and not for the purpose of propagating chemical reactions and more particularly reversible reactions involving the simultaneous formation of volatile and non-volatile products. The principle of mass action, i. e., that when two reactants A and B react to form C and D in such a way that an equilibrium mixture of A, B, C, and D is formed, the reaction may be forced to completion by constantly displacing the equilibrium by continuous removal of either C or D or both, is of course well known. This principle applies equally to reactions where only one or more than two reactants or products are involved. This type of reaction is exemplified by esterification where the reaction is forced to completion by distilling off the water as fast as it is formed, by ester interchange where an alcohol or a phenol is continuously removed by distillation, and the like. The simultaneous application of these principles of mass action with those of molecular distillation to promote or propagate chemical reactions where the effective vapor pressure of the more volatile product or products is too low to be removed by usual distillation technique and where the non-volatile product is substantially completely non-volatile, is, however, believed to be a new and valuable contribution to chemical science. By conducting such a reaction under the conditions of molecular distillation, any molecules escaping from the reacting mixture are removed with a negligible probability of return, and the equilibrium consequently is irreversibly displaced. By means of the application of these principles in the present invention reversible reactions may be carried to a degree of completion hitherto unknown for the production of various new and valuable products of which the linear condensation superpolymers herein described are examples.

The following is a more or less typical example of the method of carrying out the invention by means of a molecular still:

*Example I*

Hexadecamethylene dicarboxylic acid and trimethylene glycol (molecular ratio 1:1.2) were heated together first at atmospheric pressure for 3 hours at 170° C. to 180° C. and then under 1 mm. pressure, for 7 hours at 220° C. The brittle, waxy product was crystallized from hot ethyl acetate from which it separated as a microcrystalline powder. A sample of polyester prepared in this manner (average molecular weight ca. 3500) was heated at 200° C. for 7 days in an apparatus arranged with a condenser cooled by circulating tap water 2 cm. above the distilling surface. The pressure was maintained at $10^{-5}$ mm. or below. The reaction proceeded with the accumulation of a small amount of low molecular weight material on the condenser. The polyester before this treatment was a microcrystalline powder; in the mass it was brittle, opaque, and very weak mechanically. The product after the molecular still treatment was a tough, flexible, elastic, translucent mass which had an average molecular weight of at least 12,000 and which could be "cold-drawn" into strong, lustrous, pliable, elastic, highly oriented fibers. The phenomenon of cold-drawing will be more fully described below.

The preferred method of transforming linear condensation polymers into the superpolymers consists in heating the polymer in a molecular still. It is to be understood, however, that irrespective of the method of preparation my invention includes the entire class of compounds designated by the terms synthetic linear condensation superpolymer, since no members of this class have been described or produced hitherto. Among the suitable methods, in addition to the use of the molecular still, by means of which the reaction may be carried out there may be mentioned the passage of an inert gas or an organic vapor through or over the molten polymer with or without the use of reduced pressure to carry away the volatile products. The reaction may also be carried out in a solvent with or without the addition of catalysts with arrangements for distilling and returning the solvent after separating the volatile products of the reaction distilling with it. The purpose may likewise sometimes be effected simply by prolonged heating in a good vacuum, and it is advantageous when using this method to have the material spread out in a thin layer. In certain cases also this purpose may be effected by using powerfully adsorbent materials such as silica gel, absorbent carbon, activated alumina, etc., etc., to bring about the irreversible absorption of the volatile reaction products. The reaction must be carried out at a temperature high enough to make the rate of reaction appreciable but low enough to avoid any thermal decomposition. The use of temperatures over 300° C. is not advisable. The range 150–250° C. is particularly suitable.

Various types of linear polymers can be brought into the superpolymeric state and the transformation, as in the examples mentioned, is accompanied by a similarly remarkable change in physical properties. I may use, for example, compounds selected from the following seven classes:

(1) Polyethers derived from dihydric alcohols such as ethylene glycol, propylene glycol, trimethylene glycol, hexamethylene glycol, etc., and prepared either directly from these glycols or from appropriate derivatives of the glycols.

(2) Polyesters derived from hydroxy acids such as lactic acid, -hydroxydecanoic acid, -hydroxycaproic acid, etc., and prepared either directly from the hydroxy acids or from appropriate derivatives of the hydroxy acids.

(3) Polyesters derived from dibasic acids plus glycols. As acids may be mentioned carbonic, oxalic, succinic, glutaric, adipic, pimelic, sebacic, hexadecamethylenedicarboxylic, phthalic, etc.; as glycols, ethylene glycol, propylene glycol, trimethylene glycol, hexamethylene glycol, decamethylene glycol, etc. The polyesters may be prepared either directly from the acids and the glycols, or they may be prepared from some suitable derivatives of the acid and the glycols.

(4) Polyamides derived from amino acids such as 5-amino-caproic acid ($NH_2(CH_2)_5COOH$), 10-aminoundecanoic acid ($NH_2(CH_2)_{10}COOH$), etc. The naming of the amino acids mentioned herein is in accordance with the system of numbering given in Organic Chemistry by Holleman, 7th Edition (1930). By amino acids I mean not only the acids themselves but also derivatives thereof inasmuch as these polyamides may be prepared either directly from the amino acids or from some suitable derivatives of the amino acids.

(5) Polyamides derived from dibasic acids plus diamines. As acids may be mentioned those referred to under (3) above, and as diamines ethylenediamine, trimethylenediamine, propylenediamine, pentamethylenediamine, bezidine, phenylenediamine, etc. By dibasic acids and diamines as used in this classification I mean not only the dibasic acids and diamines themselves but also derivatives thereof inasmuch as the polyamides may be prepared either directly from the acids plus the diamines or from some suitable derivatives of the acids and the diamines.

(6) Polyanhydrides derived from dibasic acids, such as adipic acid, pimelic acid, suberic acid, sebacic acid, hexadecamethylenedicarboxylic acid, etc.

(7) Polyacetals derived from aldehydes plus glycols. As aldehydes may be mentioned acetaldehyde, propionaldehyde, butyraldehyde, benzaldehyde, etc.

I may also use mixed polymers such as mixed polyester-polyamides prepared by heating together a mixture containing a dibasic acid, a glycol, and a diamine; or a mixture containing both an hydroxy acid and an amino acid, etc. And in general I may use any polymers which result from reversible bifunctional condensations. I may of course also use any of the simple bifunctional compounds from which initial polymers are prepared, since the formation of the superpolymer involves the initial polymer as a necessary intermediate step. The only limitation necessary here is that the simple bifunctional compounds used should be capable of forming a polymer. Thus, it is not possible to prepare a superpolymer from ethylene glycol and diethyl carbonate because, although those are bifunctional compounds, the ester product, ethylene carbonate, is a 5-membered monomeric ring. No polymeric product is formed, and hence no superpolymer can be obtained. On the other hand the higher glycols (tetramethylene, hexamethylene, decamethylene) do react with diethyl carbonate to form polymers (Cf. Carothers application No. 406,721) and superpolymers can be prepared either starting with these polymers or starting directly with the diethyl carbonate and the glycol.

In addition to the examples previously mentioned, the nature of the invention may be further illustrated by the following specific examples:

Example II

A sample of the initial ester used in the previous example was heated at 200–250° C. for 32 hours with a current of dry nitrogen bubbling through the molten mass. The viscosity of the molten polymer increased very greatly and the product exhibited the phenomenon of "cold-drawing".

Example III

Succinic acid and ethylene glycol (molecular ratio 1:1.05) were heated together first at atmospheric pressure for 3 hours at 175° C. to 185° C. and then under a good vacuum (less than 1 mm.) for about 3 hours at 200–250° C. The product was polymeric ethylene succinate in the form of a hard, brittle wax melting at 103° C. (See Carothers and Arvin, J. Am. Chem. Soc. 51, 2560 (1929); Carothers and Dorough, ibid., 52, 711 (1930)). A sample of this polyester was heated for 7 days at 200° C. in a molecular still. The product was a tough, flexible, elastic mass which could be drawn out into elastic, strong, highly oriented fibers.

Example IV

ω-hydroxydecanoic acid was heated at 100° for 10 hours under a moderate vacuum. The product was a non-volatile polyester in the form of a brittle wax. This material was transferred to a molecular still and heated to 200° C. for 7 days. The product was a tough, flexible, elastic polyester. Its apparent average molecular weight was about 25,000. It possessed the property of "cold-drawing", and yielded fibers which were pliable, strong and elastic.

Example V

Sebacic acid was heated under reflux for 5 hours with three times its weight of acetic anhydride. The excess acetic anhydride and the acetic acid formed in the reaction were then removed by distillation under vacuum. The brittle, waxy residue was dissolved in hot, dry benzene and precipitated with petroleum ether. The precipitate was dried in a vacuum over potassium hydroxide. The product was polymeric sebacic anhydride in the form a dusty powder melting at 79° C. (See Voorman, Rec. trav. chim., 23, 265 (1904)). A sample of the product was heated at 200° C. for several days in a molecular still. The product, unlike the initial anhydride, was a strong, very tough mass which could readily be drawn into strong, pliable, highly oriented filaments. Since the chemical properties of this final product were identical with those of the initial anhydride, the profound change in physical properties must be ascribed to an increase in the degree of polymerization.

Example VI

A polymeric amide (molecular weight ca. 1000) obtained by heating 5-aminocaproic acid was heated at 200° C. for 2 days in a molecular still. The product was a hard mass much tougher and more flexible than the initial polymer.

Example VII

A mixture of sebacic acid, decamethylene glycol and 5-aminocaproic acid in equimolecular proportions was heated first at atmospheric pressure and then at reduced pressure. The brittle, wax-like product of this reaction was transferred to a molecular still and heated for several days at 200° C. The product was a very tough, flexible resin which softened at 50° C.

Example VIII

Ethyl sebacate, ethylenediamine, and ethylene glycol (molecular ratio 2:1:1) were heated in a sealed tube. The powdery product from this reaction was heated at 250–300° C. in a molecular still for 5 days. The product was a very hard, tough, opaque mass which softened at 290° C.

Example IX

A mixture of ω-hydroxydecanoic acid and 5-amino caproic acid (molecular ratio 1:1) was heated first at atmospheric pressure and then at reduced pressure. This material was converted by heating in a molecular still for 6 days at 200° C. into a fairly tough, elastic product which yielded fibers on "cold-drawing".

Example X

Trimethylene glycol, hexadecamethylenedicarboxylic acid, and 5-aminocaproic acid (molecular ratio 1:1:1) were heated together at 200–220° C. in a current of dry nitrogen until no more water was evolved. The mixture was then heated for several hours at 250–260° C. at 1 mm. pressure. The product was heated for 4 days at 200° C. in a molecular still. The product was tough and elastic and yielded strong oriented fibers. It started to soften at about 75° C.

In the following two examples the superpolymers are made by prolonged heating at reduced pressure:

Example XI

Trimethylene glycol, hexadecamethylenedicarboxylic acid and 5-aminocaproic acid (molecular ratio 1:1:3) were heated first at atmospheric pressure and then at reduced pressure at 200–250° C. for 6 hours. The product was very tough, flexible, and elastic and yielded oriented fibers. It started to soften at about 135° C.

Example XII

One-half mole of sebacic acid and 0.525 mole of ethylene glycol were heated for 4 hours at 175–200°. The mixture was then subjected to heating at 250° for 5 hours at 2 mm. pressure. The product was a hard, brittle wax which was obtained in the form of a powder after crystallization from ethyl acetate. Both the wax and the powder yielded threads which could be drawn when slightly warm into fairly strong, pliable, elastic, highly oriented lustrous fibers.

Linear condensation superpolymers generally differ from ordinary linear condensation polymers in the following respects: they are more viscous when molten; they dissolve more slowly and solution is preceded by swelling; their solutions are more viscous; in the massive state they are stronger, tougher, and more pliable; usually they can be drawn out into oriented threads or filaments which are very strong and pliable. The properties of linear condensation superpolymers are determined in part by the nature of the units of which their molecules are composed. The superpolyamides have high melting points and are insoluble in most of the common solvents. On the other hand, superpolyesters are less brittle, they are more readily soluble, and they usually become thermoplastic at temperatures below 150° C. Mixed polyester-polyamides lie between polyesters and polyamides in their properties.

The properties which characterize the linear condensation polymers which constitute this invention adapt them to a variety of useful purposes. As mentioned above, those which have the capacity to be drawn into strong, oriented fibers are adapted to be used as artificial silk, artificial hair, bristles, threads, filaments, yarns, strips, films, bands, and the like. Further, the polymers of tough and elastic character may be used in plastic and elastic compositions or molding compositions, or as film forming materials. They may also be used as modifying agents for cellulose acetate or other cellulose derivatives.

The compounds covered in this invention may also be used with considerable advantage in paints, varnishes, lacquers and enamels in a number of ways. They may be used as substitutes for the resin constituent, as substitutes for the softener constituent, as substitutes for the total resin plus softener constituents, or as partial substitutes for either the resin constituent or the softener constituent in clear or pigmented lacquer compositions. They may also be used by themselves for the preparation of lacquers along with pigments in the formulation of enamel compositions. They may also be used with other resins, e. g., in mixtures with Bakelite, phenol-formaldehyde, and rosin or oil modified polyhydric alcohol-polybasic acid condensation products. These latter condensation products are made, as understood by those skilled in the art, by reacting together with heat treatment a polyhydric alcohol such as glycerol; a polybasic acid, such as phthalic acid; rosin; and/or a fatty oil, such as linseed oil, or the corresponding amount of oil acids.

Use of the compounds disclosed in this invention in lacquer and enamel compositions imparts marked improvements in toughness, adhesion and flexibility characteristics without any appreciable sacrifice in other characteristics such as drying qualities, hardness, water resistance, thermoplasticity, and solids content. Since these compounds function as toughening and flexibilizing agents, and since there is no chemical change in these compositions on aging, they contribute to systems to which they are used considerably improved retention of flexibility and consequently a higher order of durability.

These compounds may also be used for coating sheeted materials such as cloth, paper, and leather. For this application they are generally mixed with pyroxylin and used in combination with softening ingredients such as castor oil, cottonseed oil, tricresyl phosphate, acetyl laurin, etc. They may also be used as modifying ingredients in the preparation of plastic compositions for use either in the fabrication of molded articles or sheeted materials for use in various applications such as in the manufacture of safety glass. It is to be understood that in all of these applications the compositions disclosed in this invention may be used either alone, in combination with cellulose derivatives such as cellulose acetate, cellulose nitrate, ethyl cellulose and benzyl cellulose; in combination with natural resins such as rosin, damar, Congo, Pontianak and manila gums; along with synthetic resins such as phenol-formaldehyde, urea-formaldehyde, acetone-formaldehyde, and polyhydric alcohol-polybasic acid condensation products; and in combinations with softeners such as triacetin, triphenyl phosphate, dibutyl phthalate, tricresyl phosphate, cellosolve stearate, acetyl-laurin, as well as castor oil, cottonseed oil, and other vegetable oils.

An especially valuable and remarkable property of the synthetic compounds of the present invention resides in their capacity to be drawn into strong, flexible fibers which are in some respects, especially in their elastic properties and high ratio of wet strength to dry strength, superior to any artificial fibers that have been prepared hitherto. This capacity appears to depend upon the extraordinary facility with which the polymers of this invention accept a very high degree of permanent orientation under the action of mechanical stress. In the massive state at ordinary temperatures these condensation polymers are generally tough, opaque masses. The opacity is associated with a certain degree of microscopic or sub-microscopic crystallinity since the materials when examined by the usual X-ray methods furnish powder diffraction patterns and since on being heated the opacity completely disappears at a definite temperature. Except in those instances in which the melting point of the polymers lies so high that melting is accompanied by decomposition threads of these polymers are readily obtained by touching a molten specimen with a rod and drawing the rod away. When this drawing is done very slowly the threads closely resemble the mass from which they were drawn, that is, they are opaque and show the same melting point as before. Very fine threads prepared in this way are frequently lacking in pliability and are somewhat fragile. However, if such threads are subjected to stretching at ordinary or slightly elevated temperatures they are profoundly changed in their physical properties. The stretching results in a permanent elongation; the original thread first separates into two sections joined by a thinner transparent section, and as the stretching continues this transparent section grows until the opaque sections are completely exhausted. The fiber produced in this way is very much stronger than the thread from which it was drawn. It is also more pliable and elastic. Its melting point is changed and its transparency and luster increased. It exhibits a high degree of birefringence and parallel extinction between crossed Nicol's prisms and furnishes a typical oriented fiber diagram when examined by X-ray methods in the usual way. This method of imparting new properties to the polymers is referred to as "cold-drawing". Such oriented fibers may be obtained also directly from a molten mass of the polymer if the thread is drawn out rapidly enough to produce tension during the drawing.

For the actual manufacture of fibers from the polymers of this invention, I may use various methods of spinning. That is, I spin the molten polymer, or a solution made by dissolving the polymer in a solvent, through a fine nozzle or spinneret. Thus, I may prepare a solution of the polymer either alone or together with another fiber forming material such as cellulose derivatives, e. g., cellulose nitrate, cellulose acetate, ethyl cellulose, etc. in a solvent such as chloroform and extrude the solution through a fine nozzle or spinneret into a chamber maintained at elevated temperature to accelerate the evaporation of the solvent. Such a solution instead of being spun into a chamber containing air may also be spun directly into a liquid capable of dissolving the solvent but not the polymer. In a similar manner many of the polymers of this invention can be spun directly in the molten state from a spinneret maintained at a suitably elevated temperature. In this case, no arrangements are necessary to provide for the removal of solvent. Whatever method is used for spinning the fibers, it is necessary to finally submit the threads to the action of mechanical stress or stretching to produce the high orientation which is associated with a high degree of strength, pliability and elasticity. This stretching may be carried out at ordinary or slightly elevated temperature after the spinning operation is completed, but I prefer to make the stretching an integral part of the spinning operation. This may be done by passing the thread over rollers after it has become partially or completely solidified or coagulated, the said rollers being caused to rotate at different speeds; or the thread can be stretched by passing it around a series of staggered pins in a zig-zag fashion; or it can be passed around a series of rollers where it is made to do work progressively on these rollers; or one can use any other means which are ordinarily associated with what is known in the spinning industry as methods for producing tension-spun threads or filaments. In a similar manner films, bands, strips, and the like can be formed and subjected to mechanical stretching to produce the orientation, strength and other desirable properties already indicated.

It has already been mentioned that the fibers prepared from the materials of this invention not only have a high degree of strength, pliability and luster but they are superior to any artificial fibers known hitherto in the fact that their wet strength is substantially equal to their dry strength and in the fact that their elastic recovery resembles that of natural silk and in certain instances is even better than natural silk. A further unique property of the polymers of the present invention lies in the fact that it is possible to spin them in the form of exceedingly fine filaments. Thus it is easily possible to spin filaments as fine as ½ denier or even less and these fibers have very good properties.

The fibers produced in accordance with the following example are typical of those which can be made from the polymers disclosed in this invention:

*Example XIII*

The superpolymer prepared from the polyester of trimethylene glycol and hexadecamethylene-dicarboxylic acid as described in Example I was dissolved in chloroform to form a solution containing 23% by weight of the polymer. The solution was extruded through a spinneret with 0.0045 inch holes into a chamber heated to about 30° C. The resulting fibers, after stretching or "cold-drawing" to the fullest extent were subjected to physical tests which yielded the following information. The dry tenacity is at least 1.1 grams per denier and probably higher. The fibers of this invention are usually characterized by a tenacity greater than 0.5 gram per denier. The wet tenacity is at least equal to the dry tenacity. The luster is good, resembling silk. The pliability is also very remarkable. It is possible to tie hard knots in the fiber without producing any noticeable diminution in tenacity. The fibers show very remarkable elastic recovery (true elasticity) both wet and dry, being in this respect vastly superior to rayon and, in certain instances, equal to or even better than natural silk.

The remarkable elastic recovery characteristics of this product may be seen by a comparison of it with samples of viscose rayon and natural silk. A sample of ordinary viscose rayon was stretched 4% and held there for 1 minute after which the load was removed. In one minute it had recovered 28% of the extension. Fibers of the superpolymer submitted to the same test had recovered 89% in the same time. The values for wet fibers in the same test were 59% for the viscose rayon and 99% for the artificial fiber. A sample of natural silk recovered 56% dry and 50% wet.

Examples of other superpolymers which have been observed to exhibit the property of "cold-drawing" and the capacity to be formed into oriented fibers are those derived from: (1) polyesters derived from dibasic acids plus glycols, as ethylene succinate and ethylene sebacate in Examples III and XII; (2) polyesters derived from hydroxy acids, as ω-hydroxydecanoic acid in Example IV; (3) polyanhydrides derived from dibasic acids, as polymeric sebacic anhydride in Example V; (4) mixed polymers, as ω-hydroxydecanoic acid plus 5-aminocaproic acid in Example IX and trimethylene glycol plus hexadecamethylenedicarboxylic acid plus 5-aminocaproic acid in Examples IX and XI.

When selecting superpolymers for fiber formation those superpolymers should be chosen which are sufficiently soluble in some solvent to give a solution which can be spun or sufficiently thermoplastic at some temperature below their decomposition temperatures to be drawn into fibers. In this connection it should be mentioned that polyamides are very much less soluble than polyesters, but they can usually be dissolved in hot phenol or hot formamide.

From the foregoing it will be seen that I have produced new compounds having unique properties not possessed by the compounds from which they are prepared. The production of artificial fibers as disclosed herein through the actual synthesis of the materials from which the fibers are made is to be sharply distinguished from the manufacture of fibers (as for instance artificial silk from cellulose) from materials in which the fiber-forming molecules simply serve as the initial raw material and are not produced by synthesis. The present invention may, therefore, be regarded as the first step in the art of preparing synthetic materials suitable for making useful artificial fibers, an art, which in the sense of the present invention, has hitherto been nonexistent.

As many apparently widely different embodiments of this invention may be made without departing from the spirit and scope thereof, it is to be understood that I do not limit myself to the specific embodiments thereof except as defined in the appended claims.

I claim:

1. A synthetic polymer in the form of a useful pliable artificial fiber showing by characteristic X-ray patterns orientation along the fiber axis.

2. A synthetic polymer in the form of an artificial fiber exhibiting permanent orientation along the fiber axis and having a tenacity of at least 1.1 grams per denier.

3. A synthetic polymer in the form of a pliable artificial fiber exhibiting permanent orientation along the fiber axis and capable of being tied into hard knots.

4. A synthetic polymer in the form of an artificial fiber exhibiting permanent orientation along the fiber axis and having a wet strength substantially equal to the dry strength.

5. A synthetic condensation polymer in the form of an artificial fiber having elastic properties such that when it is stretched 4% for one minute it recovers at least 80% of its extension during the first minute of release.

6. An artificial fiber exhibiting definite orientation along the fiber axis and comprising a synthetic linear condensation polymer.

7. An artificial fiber comprising a synthetic linear condensation polymer having an average molecular weight not less than 10,000.

8. An artificial fiber comprising a mixture of a synthetic linear condensation polymer having an average molecular weight of at least 10,000 and a cellulose derivative.

9. An artificial fiber comprising a mixture of a synthetic linear condensation polymer having an average molecular weight of at least 10,000 and cellulose acetate.

10. A method of manufacturing artificial synthetic fibers which comprises forming a linear condensation polymer having a molecular weight of at least 10,000 into filaments and "cold-drawing" said filaments.

11. A method of manufacturing artificial synthetic fibers which comprises drawing a filament from a molten linear condensation polymer having a molecular weight of at least 10,000 and submitting said filament to action of stress to produce fiber orientation along the axis thereof.

12. A method of manufacturing artificial synthetic fibers which comprises extruding through a fine nozzle a linear condensation polymer having a molecular weight of at least 10,000 and stretching the extruded filaments.

13. A synthetic material in the form of a pliable fiber, said material being a synthetic linear condensation polymer obtained from bifunctional condensations.

14. An artificial fiber exhibiting permanent orientation along the fiber axis and comprising a synthetic linear condensation polymer having an average molecular weight not less than 10,000.

15. An artificial fiber exhibiting permanent orientation along the fiber axis, having a tenacity greater than 0.5 gram per denier and comprising a synthetic linear condensation polymer having an average molecular weight not less than 10,000.

16. An artificial fiber exhibiting permanent orientation along the fiber axis, having a tenacity of at least 1.1 grams per denier and comprising a synthetic linear condensation polymer having an average molecular weight not less than 10,000.

17. An artificial fiber exhibiting permanent orientation along the fiber axis, having a tenacity of at least 1.1 grams per denier, having a wet strength not substantially less than its dry strength and comprising a synthetic linear condensation polymer having an average molecular weight not less than 10,000.

18. An artificial fiber exhibiting permanent orientation along the fiber axis, having a tenacity of at least 1.1 grams per denier, having a wet strength not substantially less than its dry strength, having a high elastic recovery and comprising a synthetic linear condensation polymer having an average molecular weight not less than 10,000.

19. An artificial fiber exhibiting permanent orientation along the fiber axis, having a tenacity of at least 1.1 grams per denier, having a wet strength not substantially less than its dry strength, having a high elastic recovery and comprising a synthetic linear condensation polymer having an average molecular weight not less than 10,000, said polymer resulting from the product of a reversible bi-functional condensation.

20. An artificial fiber exhibiting permanent orientation along the fiber axis, having a tenacity of at least 1.1 grams per denier, having a wet strength not substantially less than its dry strength, having a high elastic recovery and comprising a synthetic linear condensation polymer having an average molecular weight not less than 10,000, said polymer resulting from the product of a reversible bi-functional condensation involving as a reactant a compound having a carboxyl radical.

21. An artificial fiber exhibiting permanent orientation along the fiber axis, having a tenacity of at least 1.1 grams per denier, having a wet strength not substantially less than its dry strength, having a high elastic recovery and comprising a synthetic linear condensation polymer having an average molecular weight not less than 10,000, said polymer resulting from the product of a reversible bi-functional condensation between hexadecamethylene dicarboxylic acid and trimethylene glycol.

22. A synthetic oriented artificial fiber exhibiting birefringence with parallel extinction between crossed Nicol prisms and exhibiting characteristic X-ray patterns, said fiber comprising a synthetic linear condensation product having an average molecular weight not less than 10,000.

23. A synthetic condensation polymer in the form of an artificial fiber having a tenacity of at least 1.1 grams per denier and capable of being tied into hard knots.

2. A method of manufacturing artificial fibers which comprises drawing a filament from a synthetic polymer and submitting said filament to stress to produce a fiber showing by characteristic X-ray pattern orientation along the fiber axis.

25. The process set forth in claim 24 in which the polymer is in the molten state and is formed into said filament by extrusion through a fine nozzle.

26. A method of manufacturing artificial fibers which comprises drawing a filament from a solution of synthetic polymer, evaporating the solvent, and submitting said filament to stretch to produce a fiber showing by characteristic fiber X-ray patterns orientation along the fiber axis.

27. A method of manufacturing artificial fibers which comprises drawing a filament from a solution of synthetic polymer into a liquid which dissolves the solvent but not the polymer, and submitting said filament to stretch to produce a fiber showing by characteristic fiber X-ray patterns orientation along the fiber axis.

28. A synthetic polymer in the form of a pliable artificial fiber exhibiting orientation along the fiber axis and being capable of fusion without substantial decomposition.

29. The artificial fiber set forth in claim 6 in which said polymer is a synthetic linear condensation polyamide.

30. The artificial fiber set forth in claim 6 in which said polymer is a synthetic linear condensation polyamide derived from an amino acid.

31. The artificial fiber set forth in claim 6 in which said polymer is a synthetic linear condensation polyester.

32. The artificial fiber set forth in claim 6 in which said polymer is a synthetic linear condensation polyacetal.

33. The method set forth in claim 24 in which said polymer is a synthetic linear condensation polyamide.

34. The method set forth in claim 24 in which said polymer is a synthetic linear condensation polyester.

35. The method set forth in claim 24 in which said polymer is a synthetic linear condensation polyacetal.

WALLACE H. CAROTHERS.